UNITED STATES PATENT OFFICE.

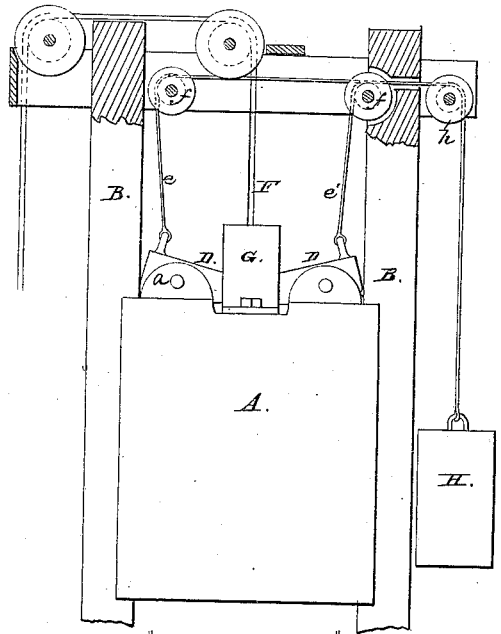
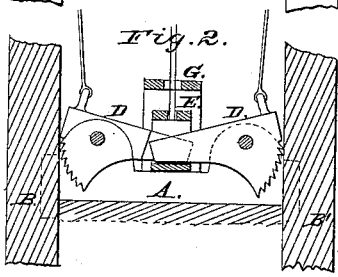
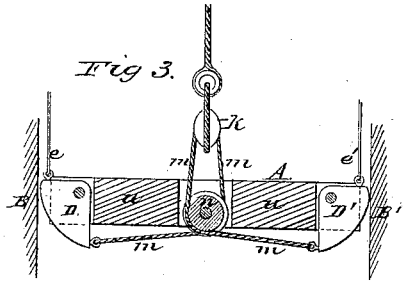
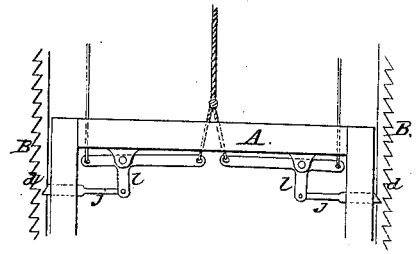
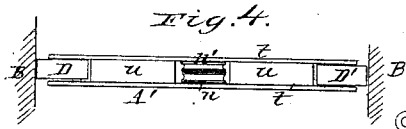
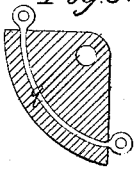

J. VAUGHAN MERRICK AND W. H. MERRICK, OF PHILADELPHIA, PA.

IMPROVEMENT IN HOISTING APPARATUS.

Specification forming part of Letters Patent No. 78,675, dated June 9, 1868.

*To all whom it may concern:*

Be it known that we, J. VAUGHAN MERRICK and WILLIAM H. MERRICK, both of Philadelphia, Pennsylvania, have invented certain Improvements in Hoisting Apparatus; and we do hereby declare the following to be a full, clear, and exact description of the same.

Our invention consists of the combination, with a hoisting-cage, of a counter-weight arranged to move in a contrary direction to the said cage, the weight being connected to cam-levers or their equivalents, all substantially as described hereinafter, so that on the breaking of the hoisting-rope the cage will be promptly arrested.

In order to enable others skilled in the art to make and use our invention, we will now proceed to describe its construction and operation, reference being had to the accompanying drawing, which forms a part of this specification, and in which—

Figure 1 is a front view, partly in section, of hoisting apparatus with our improvement; Fig. 2, a vertical section of part of the apparatus; Fig. 3, a modification of our invention; Fig. 4, a plan view of Fig. 3; Fig. 5, an enlarged view of part of Fig. 3, and Fig. 6 a modification of our invention.

On reference to Figs. 1 and 2, A represents the cage, and B and B' the two guiding-frames. To projections or lugs $a$ $a$ on the top of the cage are hinged two levers or dogs, D and D', the short cam-like arms of which are arranged to bite against the guiding-frames B and B', under the circumstances described hereinafter. The long arms of the levers project into or through a yoke, E, to which the hoisting-rope F is secured, the yoke being contained within a staple-like projection, G, on the top of the cage A, this projection being of such dimensions as to allow the yoke a limited vertical movement. To the lever D is connected a rope, $e$, which passes over suitable guiding-pulleys, and is attached to the weight H, a similar rope, $e'$, connected to the lever D', passing over guide-pulleys, and being attached to the same counterbalance-weight.

In hoisting the cage, the yoke E bears against the top of the projection G, and, consequently, the long arms of the levers D and D' are elevated so that their short cam-like arms are free from contact with the guides B and B'; but, should the hoisting-rope break, the weight H will instantly raise the short arms of the levers relatively to the cage, so that their serrated cam-like edges will bear against the guides B and B', and will prevent the falling of the cage.

In the modification illustrated in Figs. 3, 4, and 5, the top A' of the cage consists of two bars, $t$ and $t'$, of wrought-iron or other equivalent material, secured together, with intervening blocks of wood or distance-pieces $u$ between them.

Segmental cams D and D' are hung between the bars $t$ $t'$, near each end of the same, the cams being connected by cords or ropes $e$ to the above-mentioned counterbalance-weight; and to the lower end of one segmental cam is connected a rope, $m$, which passes round a pulley, $n$, hung between the bars $t$ and $t'$, round a pulley in a block, $k$, attached to the hoisting-rope, and thence round a pulley, $n'$, adjacent to the pulley $n$, to the opposite segmental cam; or, if preferred, the pulleys $n$ and $n'$ may be omitted, and the ropes $m$ carried directly from the cams D and D' to the hoisting-rope.

As long as the hoisting-rope F remains entire, the edges of the segmental cams will be free from contact with the guides B and B'; but, should the rope break, the counterbalance-weight will elevate the cams relatively to the cage, and the cage will be arrested in its descent by the cams, or, in other words, the cage will be jammed between the guides.

We prefer to make the cams in the manner illustrated in Fig. 5, the curved rod $q$, with an eye at each end for receiving the rope, being cast in the cam.

In the modification illustrated in Fig. 6, a rack, $d$, is secured to each of the guides B and B', the teeth of the racks being adapted to horizontal bolts $j$, arranged to slide in the frame of the cage, each bolt being connected to the arm $l$ of one of the bell-crank levers hung to the cage, the long arms of the levers being connected to the hoisting-rope, and the short arms to the counterbalance-weight, so that the latter, when the hoisting-rope breaks, will move outward the bolts, which catch on the teeth of the racks, and thereby prevent the descent of the cage.

We wish it to be distinctly understood that we do not desire to claim, broadly, the use of counterbalance-weights in combination with a hoisting-cage; nor do we claim, broadly, the use of cam-levers or their equivalents in combination with and for the purpose of arresting the cage when the hoisting-rope breaks; but What we do claim, and desire to secure by Letters Patent, is—

The combination, with a hoisting-cage, of a weight arranged to move in a contrary direction to the said cage when the said weight is attached to arresting-cams, levers, or their equivalents, all substantially as and for the purpose herein set forth.

In testimony whereof we have signed our names to this specification in the presence of two subscribing witnesses.

J. VAUGHAN MERRICK.
W. H. MERRICK.

Witnesses:
JOHN WHITE,
WM. ALBERT STEEL.